United States Patent
Steiss (10) Patent No.: US 10,114,638 B2
(45) Date of Patent: Oct. 30, 2018

(54) COMMAND MESSAGE GENERATION AND EXECUTION USING A MACHINE CODE-INSTRUCTION

(71) Applicant: Donald Edward Steiss, Richardson, TX (US)

(72) Inventor: Donald Edward Steiss, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 14/571,115

(22) Filed: Dec. 15, 2014

(65) Prior Publication Data

US 2016/0173601 A1 Jun. 16, 2016

(51) Int. Cl.
  *G06F 15/167* (2006.01)
  *G06F 9/30* (2018.01)
  *G06F 13/00* (2006.01)

(52) U.S. Cl.
  CPC ........ *G06F 9/30003* (2013.01); *G06F 9/3004* (2013.01); *G06F 13/00* (2013.01)

(58) Field of Classification Search
  CPC ............. H04L 67/1097; H04L 41/0233; H04L 41/0843; H04L 67/02; H04L 67/06; G06F 11/3051

(Continued)

(56) References Cited

U.S. PATENT DOCUMENTS 6,044,450 A * 3/2000 Tsushima ............ G06F 9/30025
  712/215
6,349,377 B1 * 2/2002 Lindwer ............. G06F 9/30174
  712/22

(Continued)

OTHER PUBLICATIONS

"Systems and software engineering—Vocabulary," International Standard, ISO/IEC/IEEE 24765, first edition, Dec. 15, 2012, IEEE, New York, New York.

(Continued)

*Primary Examiner* — Hamza N Algibhah
*Assistant Examiner* — Hannah S Wang
(74) *Attorney, Agent, or Firm* — The Law Office of Kirk D. Williams (57) ABSTRACT

In one embodiment, command message generation and execution using a machine code-instruction is performed. One embodiment includes a particular machine executing a single machine-code instruction including a reference into a command-message-building data structure stored in memory. This executing the single machine-code instruction includes generating a command message and initiating communication of the command message to a hardware accelerator, including copying command information from the command-message-building data structure based on the reference into the command message. The hardware accelerator receives and executes the command message. In one embodiment, the command message is message-switched from a processor to a hardware accelerator, such as, but not limited to, a memory controller, a table lookup unit, or a prefix lookup unit. In one embodiment, a plurality of threads share the command-message-building data structure. In one embodiment, a plurality of processors share the command-message-building data structure.

19 Claims, 6 Drawing Sheets

(58) Field of Classification Search
USPC .......................................................... 709/212
See application file for complete search history.

(56) References Cited

U.S. PATENT DOCUMENTS

| | | | |
|---|---|---|---|
| 6,408,382 B1* | 6/2002 | Pechanek | G06F 8/4434 341/55 |
| 7,664,897 B2 | 2/2010 | Cohen et al. | |
| 7,739,426 B1 | 6/2010 | Steiss et al. | |
| 8,381,176 B1* | 2/2013 | Bentley | G06F 8/71 717/106 |
| 9,176,739 B2 | 11/2015 | Steiss | |
| 2002/0053072 A1* | 5/2002 | Steinbusch | G06F 9/381 717/148 |
| 2004/0039940 A1* | 2/2004 | Cox | H04L 29/06 709/224 |
| 2005/0188019 A1* | 8/2005 | Mittelstaedt | G06Q 10/107 709/206 |
| 2008/0103610 A1* | 5/2008 | Ebrom | D06F 39/005 700/29 |
| 2008/0177978 A1* | 7/2008 | Karamcheti | G06F 9/5016 711/206 |
| 2009/0138871 A1* | 5/2009 | Kimberly | G06F 8/61 717/173 |
| 2010/0064147 A1* | 3/2010 | Boles | G06F 1/26 713/300 |
| 2011/0225273 A1* | 9/2011 | Fong | H04L 41/0843 709/221 |
| 2013/0036294 A1 | 2/2013 | Steiss | |
| 2014/0317384 A1* | 10/2014 | Greenhalgh | G06F 9/3802 712/213 |
| 2015/0169231 A1* | 6/2015 | Kanigicherla | G06F 3/0611 710/5 |
| 2015/0193265 A1* | 7/2015 | Riegel | G06F 9/467 711/145 |
| 2015/0277861 A1* | 10/2015 | Jennings | G06F 8/41 717/148 |
| 2015/0277967 A1* | 10/2015 | Calciu | G06F 9/467 711/147 |
| 2015/0286564 A1* | 10/2015 | Lim | G06F 12/023 711/159 |
| 2015/0339059 A1* | 11/2015 | Kang | G06F 12/023 711/154 |

OTHER PUBLICATIONS

"Systems and software engineering—Vocabulary," International Standard, ISO/IEC/IEEE 24765, Second edition, Sep. 2017, IEEE, New York, New York.

* cited by examiner

COMMAND MESSAGE GENERATION AND EXECUTION USING A MACHINE CODE-INSTRUCTION

TECHNICAL FIELD

The present disclosure relates generally to command message generation and execution, such as, but not limited to, in a message or packet switching device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packet switching devices typically have network processors that use hardware accelerators to perform statistics and other memory updates, table lookups, and prefix lookups.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with command message generation and execution using a machine code-instruction. In one embodiment, the code density in network processing code is improved by reducing the number of instructions required to construct and post transactions with hardware accelerators. These operations frequently occur in network processing code, as well as general processing systems.

One embodiment includes a particular machine executing a single machine-code instruction including a reference into a command-message-building data structure stored in memory. This executing the single machine-code instruction includes generating a command message and initiating communication of the command message to a hardware accelerator, including copying command information from the command-message-building data structure based on the reference into the command message. The hardware accelerator receives and executes the command message. In one embodiment, the command message is message-switched from a processor to a hardware accelerator, such as, but not limited to, a memory controller, a table lookup unit, or a prefix lookup unit. In one embodiment, a plurality of threads share the command-message-building data structure. In one embodiment, a plurality of processors share the command-message-building data structure.

2. Description

Disclosed are, inter alia, methods, apparatus, computer-storage media, mechanisms, and means associated with command message generation and execution using a machine code-instruction. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1:
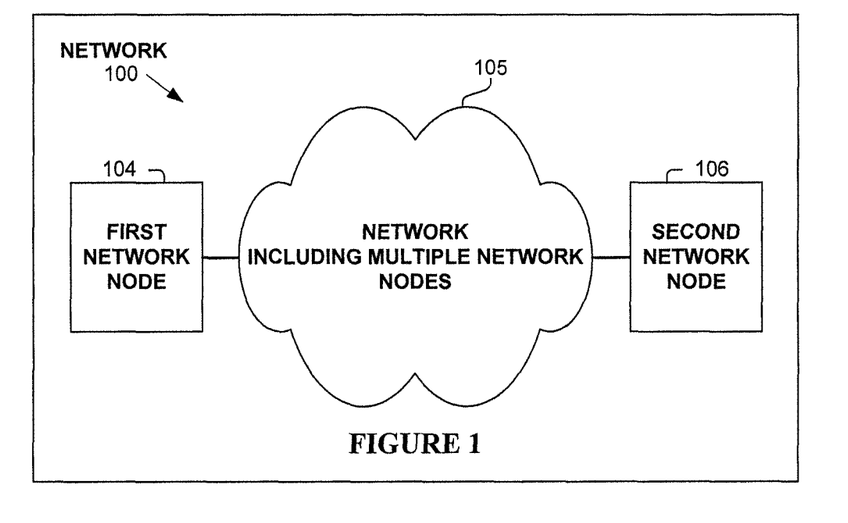
FIG. 1 illustrates a network operating according to one embodiment.

FIG. 1 illustrates a network 100 operating according to one embodiment. Shown are two packet switching devices 104 and 106 and an interconnecting network 105, including a plurality of packet switching devices. In communicating a packet, including typically for an IP packet, a packet switching device 104, 105, 106 (e.g., router) often will perform a longest prefix match on the destination address of the packet (in an appropriate context such as in a virtual routing and forwarding "VRF" context) to determine how to process the packet. The packet is then processed accordingly. As used herein, "processing" of a packet typically includes forwarding of the packet, and can include dropping of a packet, manipulating the contents of the packet, etc.

Figure 2A:
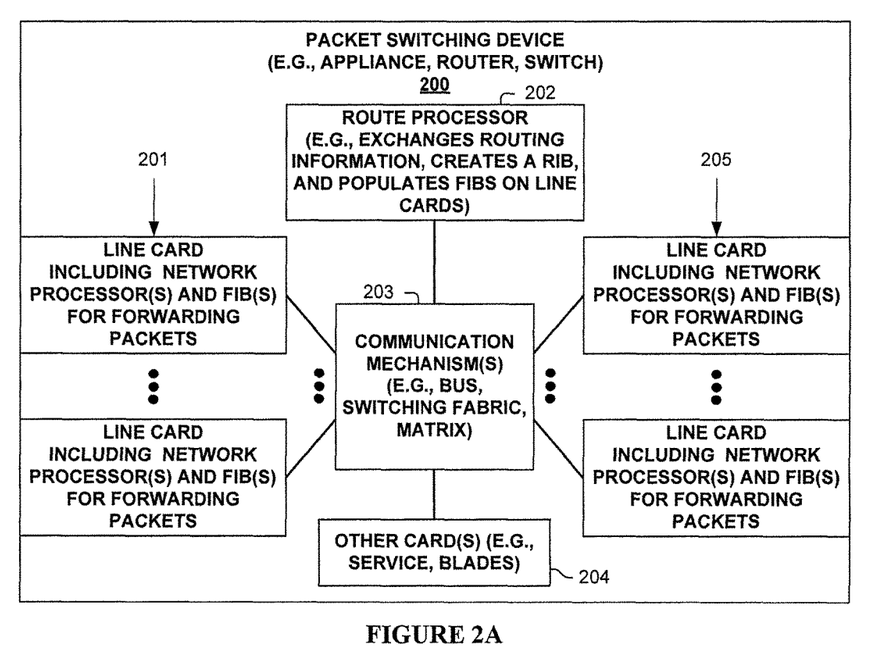
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with command message generation and execution using a machine code-instruction. Packet switching device 200 also has a control plane with one or more processing elements 202 for managing the control plane and/or control plane processing of packets associated with command message generation and execution using a machine code-instruction. Packet switching device 200 also includes other cards 204 (e.g., service cards, blades) which include processing elements that are used in one embodiment to process packets associated with command message generation and execution using a machine code-instruction, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 use command message generation and execution using a machine code-instruction to perform prefix or other address matching on forwarding information bases (FIBs) to determine how to ingress and/or egress process packets. Even though the term FIB includes the word "forwarding," this information base typically includes other information describing how to process corresponding packets.

Figure 2B:
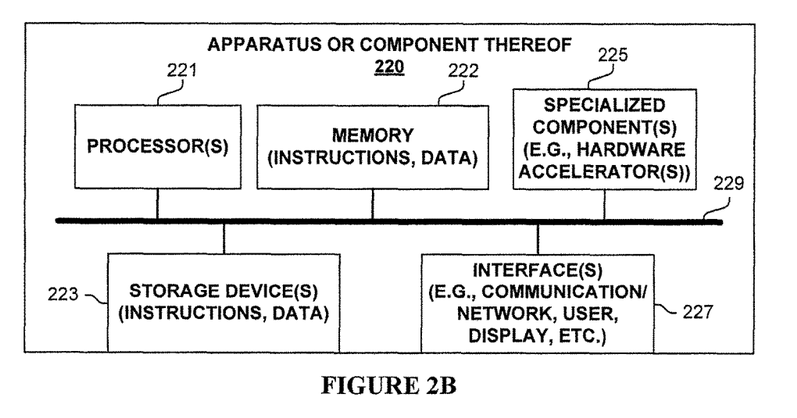
FIG. 2B illustrates an apparatus according to one embodiment.

FIG. 2B is a block diagram of an apparatus 220 used in one embodiment associated with command message generation and execution using a machine code-instruction. In one embodiment, apparatus 220 performs one or more processes, or portions thereof, corresponding to one of the flow diagrams illustrated or otherwise described herein, and/or illustrated in another diagram or otherwise described herein. In one embodiment, these processes are performed in one or more threads on one or more processors.

In one embodiment, apparatus 220 includes one or more processor(s) 221 (typically with on-chip memory), memory 222, storage device(s) 223, specialized component(s) 225 (e.g., hardware accelerator(s) such as for performing memory manipulation, lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

In networking and multicore processors, complex memory operations are often supported. These complex memory operations are indivisible or atomic operations that fit in a read-modify-write template such as increments, compare-and-swap or Boolean operations. In some cases, operations more complex than read-modify-write operations are supported by hardware.

Several trends are leading to increased usage of complex memory operations. These trends include: (1) Software Defined Network (SDN) and similar technologies that can result in an increase in statistics operations in the data plane of a packet switching device, (2) complexity increases in edge features that drive software engineers to include more instrumentation in features to validate feature functionality and performance in the lab and in the field, and (3) high performance distributed critical section or Mutex operations that use indivisible operations and multi-thread safe algorithms rather than performance-limiting centralized locking or ordering facilities.

The instruction count required to construct indivisible operations can be on the order of ten assembly instructions in source code. In one embodiment, a network processor instruction set is used to generate many types of complex memory operations with a substantially reduced number of instructions than performed by prior processes. Reducing the number of instructions required to perform these operations can increase the performance of a networking device or reduce the area or power required for a networking device.

In one embodiment, a group of instructions (e.g., quick resource commands) is added to the network processor packet processing engine instruction set. In one embodiment, these instructions provide write-serialized indivisible operations on physical addresses translated from the thread's virtual address space. In one embodiment, performing packet processing with large-scale multiprocessors, these commands are used for single-instruction statistics updates and multi-thread safe updates of data structure updates.

In one embodiment, a machine-code instruction to build and execute the command message includes four arguments: the index into the command-message-building data structure stored in memory (which may be cached), a virtual address or the address of a register that contains a virtual address, a register address or immediate value that points to the command or descriptor region in scratch-pad memory (e.g., I/O buffer), and a register address or immediate value that points to the transaction's response region in the scratch-pad memory.

Once such an instruction is decoded, the index into the command-message-building data structure is used to look up the command message's (e.g., transaction's) command data such as hardware accelerator operation and error processing instructions (e.g., response lengths and timeout controls). The command data from the command-message-building data structure is copied into the scratch-pad memory at the location specified by an argument of the single machine-code instruction. Simultaneously, the virtual address directly or indirectly referenced in an argument of the single machine-code instruction is processed by a memory management unit (MMU) to produce a logical or physical address. Finally, the single machine-code instruction posts the transaction by initiating communication to the desired hardware accelerator, such as by, but not limited to, enqueuing the command message to the message passing interconnect. If the transaction specified that a response is expected, the direct memory access (DMA) channel logic in the processor deposits the result in the location determined by the final argument of the quick resource command.

For many useful resource command messages, no additional instructions are required to produce the command message. Some command messages require additional command data. In this case, a processor (e.g., thread) writes the additional command data into the appropriate position in the message command being created in the scratch pad memory prior to execution of the single machine-code instruction.

Figure 3A:
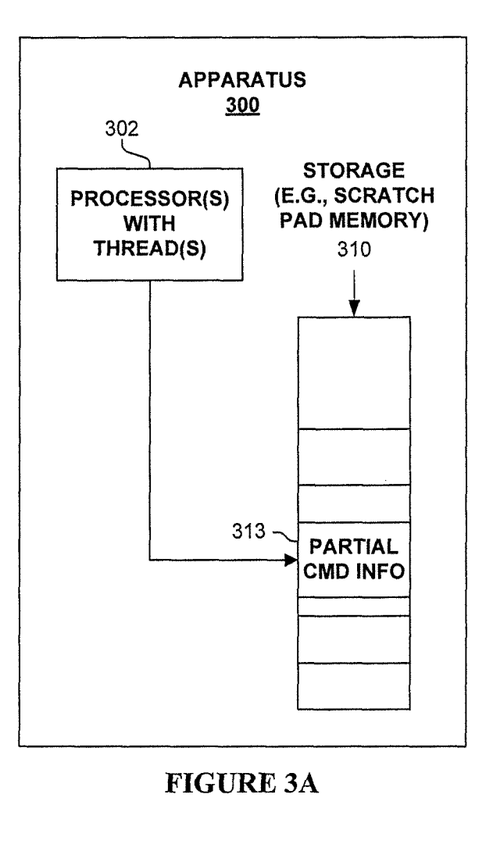
FIGS. 3A-C illustrate processes according to one embodiment.

FIG. 3A illustrates a process performed in one embodiment. As shown, an apparatus 300 includes one or more processors, each executing one or more threads, 302 and storage (e.g., scratch-pad memory/I/O buffer) 310. In one embodiment, the command message will contain additional information than that provided by execution of the single machine-code instruction. Thus, the corresponding processor thread (302) places this partial command message information 313 in storage 310 in one or more locations that corresponds to appropriate consecutive or non-consecutive position(s) within the command message to be sent to a hardware accelerator for execution. In one embodiment, this partial command information is a list of operations that are to be performed indivisibly by the hardware accelerator.

Figure 3B:
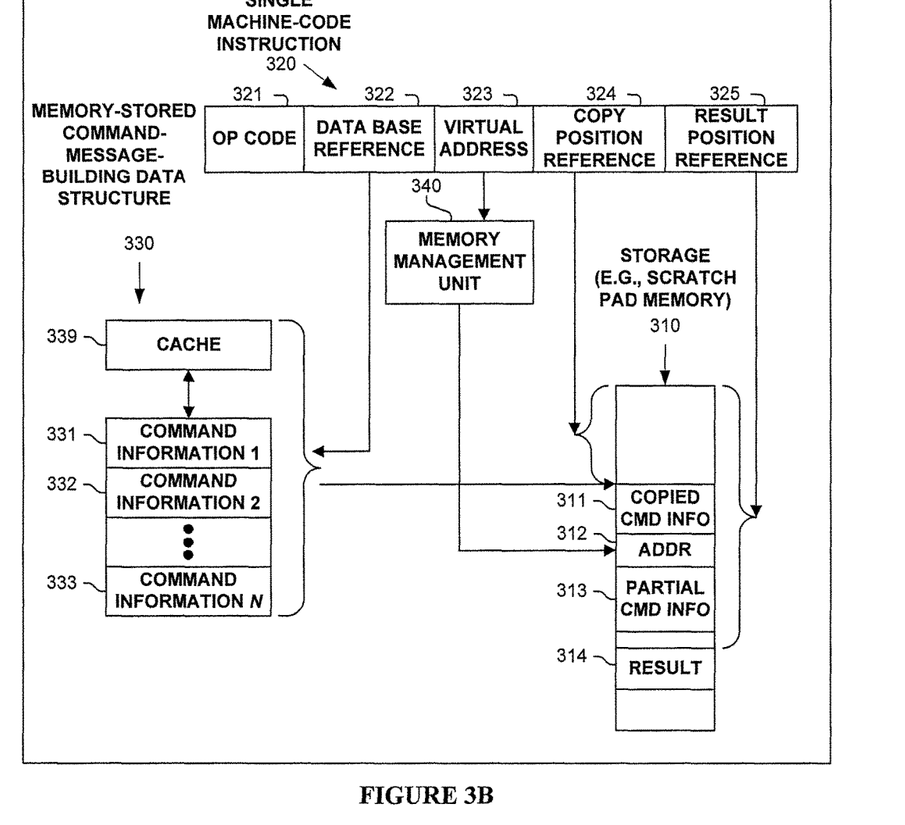

FIG. 3B illustrates a single machine-code instruction 320 according to one embodiment. As shown, single machine-code instruction 320 includes: an OP code 321 (specifying the operation of the single machine-code instruction 320), a data base reference 322, virtual address (directly or indirectly) 323, copy position reference 324, and result position reference 325. Each of values 322-325 can be direct or indirect, absolute or relative values depending on the one embodiment.

Storage 310 is used to build the command message in one embodiment, and includes partial command message information 313 discussed in relation to, and illustrated by FIG. 3A.

Data base reference 322 provides a location (331-333) within memory-stored command-message-building data structure 330 that stores command information (stored in location 331-333) to be copied into the command message being built in storage 310 at a corresponding position 311. In one embodiment, a cache 339 of one or more entries 331-333 is used to increase operational efficiency.

Virtual address 323 (directly or indirectly) provides a virtual address that is provided to memory management unit 340, which converts it to a logical or physical address which is placed into the command message being built in storage 310 at a corresponding position 312.

Copy position reference 324 defines the position 311 in into the command message being built in storage 310 that the command information from command-message-building data structure 330 is copied.

Result position reference 325 provides a result position 314 in 310 for placing a result, if a result is possible from the command message.

In one embodiment, in response to execution of single machine-code instruction 320, command information is copied from command-message-building data structure 330 (e.g., from storage or cache) and the address inserted via MMU 340 into the command message being built in storage 310, and communication to the corresponding hardware accelerator of the built command message is initiated also by the execution of single machine-code instruction 320.

Figures 3C, 4:
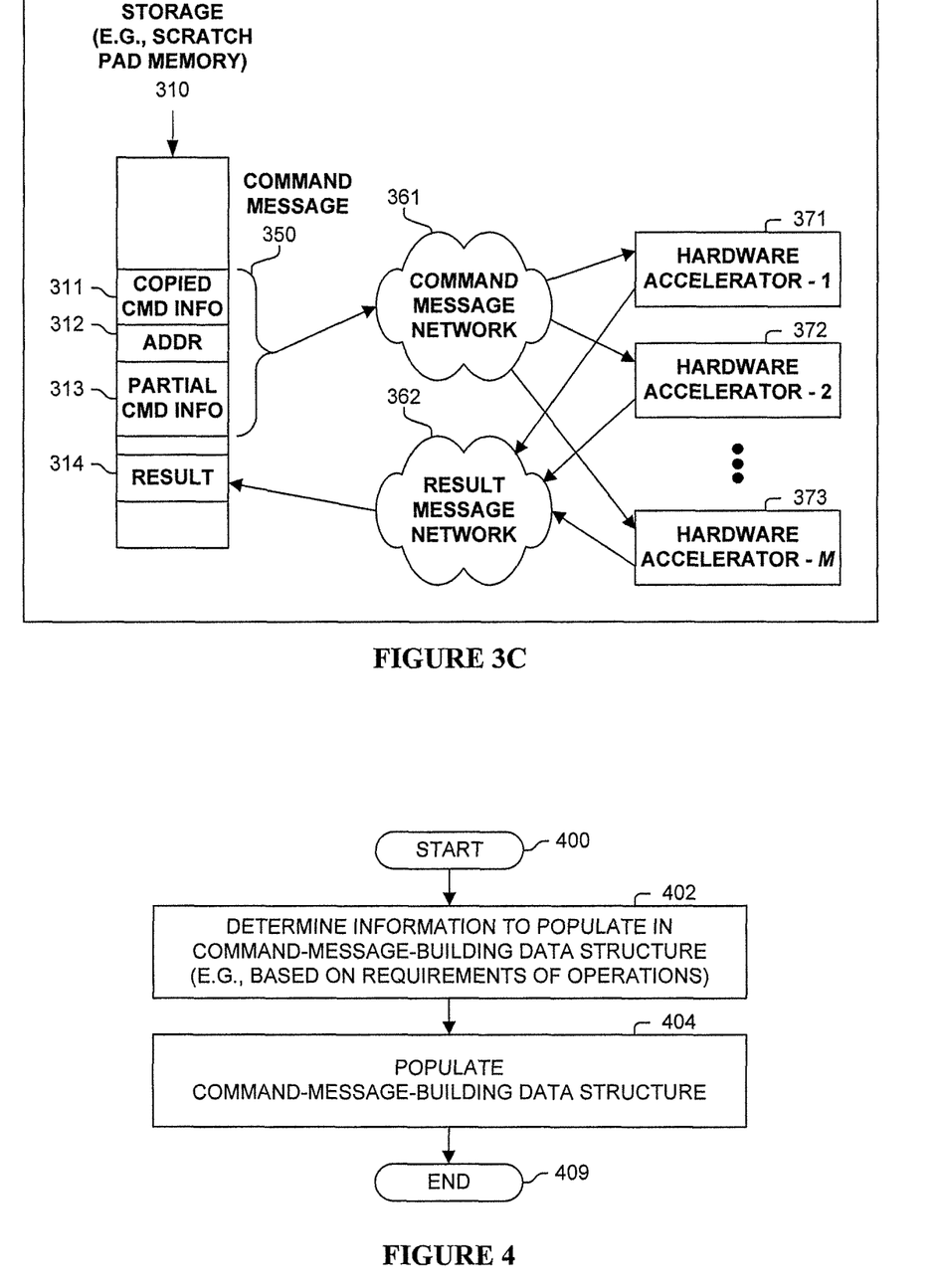
FIG. 4 illustrates a process according to one embodiment.

FIG. 3C illustrates the communication of the command message 350 and optionally a result value (314) between storage 310 and one or more of hardware accelerators 371-373. In one embodiment, copied command information 311 or partial command information 313 includes effectively an address of one or more of hardware accelerators 371-373 which is used by command message network 361 to provide command message 350 to the referenced one or more of hardware accelerators 371-373. In one embodiment, copied command information 311 or partial command information 313 includes effectively address 314 within storage 310 which is used by result message network 362 to provide a result (e.g., a value representing the result of the operation(s) performed, an indication of success or failure) into result position 314 in storage 310.

FIG. 4 illustrates a process performed in one embodiment. Processing begins with process block 400. In process block 402, a set of information to place in the size-limited memory-stored command-message-building data structure is determined. In one embodiment, the corresponding code of the operations to be performed by the thread(s) of the processors is analyzed (e.g., automatically by a processor) to identify the operations that will most benefit by using a single machine-code instruction to build the command message, rather than having the entire command message built by multiple processor machine-code instructions. In one embodiment, this set of information is determined based on the overall usage (e.g., the number of times the command message is to be built) and/or the number of machine-code instructions to build the command message which would be reduced by using the single machine-code instruction's copying of partial command information from the command-message-building data structure. In process block 404, the command-message-building data structure is populated with the determined set of information, such as, but not limited to, at boot, initialization, update, or run time. Processing of the flow diagram of FIG. 4 is complete as indicated by process block 409.

Figure 5:
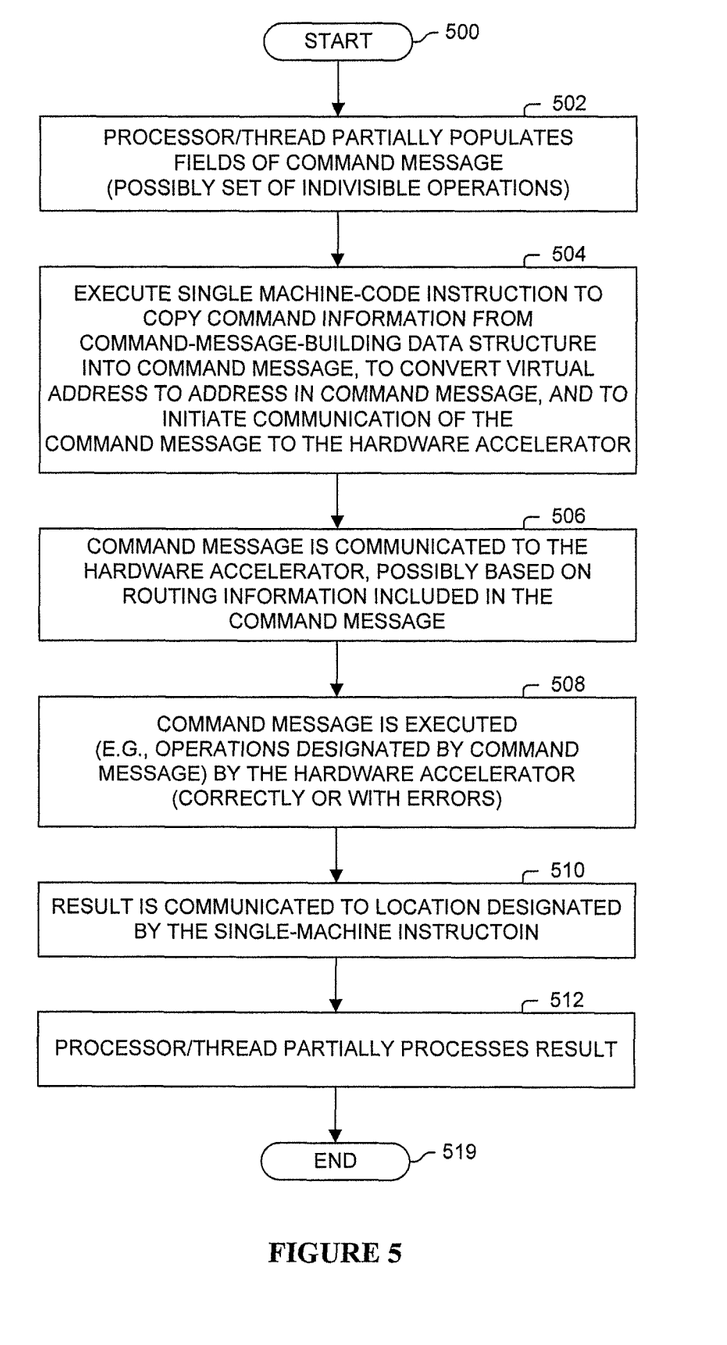
FIG. 5 illustrates a process according to one embodiment

FIG. 5 illustrates a process performed in one embodiment. Processing begins with process block 500. In process block 502, a thread of a processor optionally populates one or more fields of the command message being built. In one embodiment, a list of operations to be performed indivisibly is populated into the command message being built. In process block 504, the single machine-code instruction is executed, which in one embodiment includes, but is not limited to, copying command information from the command-message-building data structure into the command message being built, providing an address to a MMU which places the corresponding logical or physical address into the command message being built, and initiation of communicating the built command message to the corresponding hardware accelerator(s).

In process block 506, the command message is communicated to the hardware accelerator(s), which execute the command message in process block 508. During the command transfer and command execution, the processor/thread continues to execute instructions. In process block 510, the result is optionally communicated to the location typically designated in the command message. In process block 512, the thread of the processor typically processes the result.

Processing of the flow diagram of FIG. 5 is complete as indicated by process block 519.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

executing, by a processor of a particular machine, a single machine-code instruction of a processor instruction set of the processor, with the single machine-code instruction including an OP code and a plurality of arguments, with the OP code specifying to the processor the operation of the of the single machine-code instruction that includes generating a command message based on the plurality of arguments; wherein the plurality of augments includes a reference into a command-message-building data structure stored in memory, a virtual address, and a copy position reference; wherein said executing the single machine-code instruction by the processor includes generating the command message and initiating communication of the command message to the hardware accelerator, with said generating the command message including copying command information, that includes an identification of a plurality of operations, from the command-message-building data structure based on the reference into the command message at a position within the command message identified based on the copy position reference; wherein a translation of the virtual address is included in the command message;

receiving, by the hardware accelerator, the command message that includes the command information that includes the identification of the plurality of operations; and executing, by the hardware accelerator, the command message, with said executing the command message includes executing the plurality of operations.

2. The method of claim 1, wherein said initiating communication of the command message to the hardware accelerator includes enqueuing a direct memory access (DMA) operation for communicating the command message to the hardware accelerator.

3. The method of claim 2, wherein the hardware accelerator is a memory controller.

4. The method of claim 2, wherein the hardware accelerator is a table lookup unit or a prefix lookup unit.

5. The method of claim 1, wherein the command-message-building data structure is a table and the reference is an index into the table.

6. The method of claim 1, wherein said command information includes a hardware-accelerator instruction; and wherein said executing the command message includes executing the accelerator instruction.

7. The method of claim 6, wherein the hardware-accelerator instruction is to indivisibly perform the plurality of operations; and wherein said executing the command message includes indivisibly executing the plurality of operations.

8. The method of claim 1, wherein said command information includes identification of the hardware accelerator for use in communicating the command message to the hardware accelerator.

9. The method of claim 1, wherein said command information includes identification of error processing to be performed in case of an error.

10. The method of claim 1, wherein said executing the single machine-code instruction includes providing the virtual address to an address translation unit to generate the translation of the virtual address.

11. The method of claim 10, wherein the plurality of arguments of the single machine-code instruction includes a result storage position reference; wherein said generating the command message comprises including the result storage position reference in the command message; and wherein the method includes processing based on a result of said executed command message located at the result storage position.

12. The method of claim 1, wherein the plurality of arguments of the single machine-code instruction includes a result storage position reference; wherein said generating the command message comprises including the result storage position reference in the command message; and wherein the method includes processing based on a result of said executed command message located at the result storage position.

13. The method of claim 1, comprising caching at least one entry of command-message-building data structure.

14. The method of claim 1, comprising profiling a plurality of operations to determine how long or number of instructions to build a corresponding command message, and populating the command-message-building data structure with less than all of the plurality of operations based on the said how long or number of instructions to build the corresponding command message.

15. An apparatus, comprising:
a hardware accelerator;

a memory-stored command message-building data structure;

a processor that executes a single machine-code instruction of a processor instruction set of the processor, with the single machine-code instruction including an OP code and a plurality of arguments, with the OP code specifying to the processor the operation of the single machine-code instruction that includes generating a command message based on the plurality of arguments; wherein the plurality of augments includes a reference into the memory-stored command message-building data structure, a virtual address, and a copy position reference; wherein said executing the single machine-code instruction by the processor includes generating the command message and initiating communication of the command message to the hardware accelerator, with said generating the command message including copying command information, that includes an identification of a plurality of operations. from the memory-stored command-message-building data structure based on the reference into the command message at a position within the command message identified based on the copy position reference; wherein a translation of the virtual address is included in the command message;

wherein the hardware accelerator receives and executes the command message, with said executing the command message includes executing the plurality of operations.

16. The apparatus of claim 15, wherein the processor operates a plurality of threads, with each of the plurality of threads having shared-access to the memory-stored command message-building data structure.

17. The apparatus of claim 16, comprising a cache that stores a portion of the memory-stored command message-building data structure, with each of the plurality of threads having shared-access to the cache.

18. An apparatus, comprising:
a hardware accelerator that receives and executes command messages;
a memory-stored command message-building data structure;
a plurality of processors, with each particular processor of the plurality of processors executing a single machine-code instruction of a processor instruction set of the plurality of processors, with the single machine-code instruction including an OP code and a plurality of arguments, with the OP code specifying to said particular processor the operation of the single machine-code instruction that includes generating a command message based on the plurality of arguments; wherein the plurality of augments includes a reference into the memory-stored command message-building data structure, a virtual address, and a copy position reference; wherein said executing the single machine-code instruction includes generating the command message and initiating communication of the command message to the hardware accelerator, with said generating the command message including copying command information, that includes an identification of a plurality of operations, from the memory-stored command-message-building data structure based on the reference into the command message at a position within the command message identified based on the copy position reference; wherein each of the plurality of processors has shared-access to the memory-stored command message-building data structure; wherein a translation of the virtual address is included in the command message.

19. The apparatus of claim 18, wherein each of the plurality of processors operates a plurality of threads, with each of the plurality of threads having shared-access to the memory-stored command message-building data structure.

* * * * *